US007659846B2

(12) United States Patent
Olsson

(10) Patent No.: US 7,659,846 B2
(45) Date of Patent: Feb. 9, 2010

(54) METHOD FOR CREATING INTERFERENCE, AND JAMMING ARRANGEMENT

(75) Inventor: Fredrik Olsson, Örebro (SE)

(73) Assignee: BAE Systems Bofors AB, Karlskoga (SE)

( * ) Notice: Subject to any disclaimer, the term of this patent is extended or adjusted under 35 U.S.C. 154(b) by 0 days.

(21) Appl. No.: 12/162,266

(22) PCT Filed: Jan. 23, 2007

(86) PCT No.: PCT/SE2007/000054

§ 371 (c)(1), (2), (4) Date: Jul. 25, 2008

(87) PCT Pub. No.: WO2007/086790

PCT Pub. Date: Aug. 2, 2007

(65) Prior Publication Data

US 2009/0009379 A1 Jan. 8, 2009

(30) Foreign Application Priority Data

Jan. 25, 2006 (SE) .................................... 0600156

(51) Int. Cl.
*G01S 7/38* (2006.01)

(52) U.S. Cl. ........................................................ 342/14

(58) Field of Classification Search .................... 342/14, 342/15; 455/1
See application file for complete search history.

(56) References Cited

U.S. PATENT DOCUMENTS 4,433,333 A 2/1984 Manoogian
4,990,919 A 2/1991 Manoogian
5,966,091 A 10/1999 Andersson
6,414,622 B1 7/2002 Rougas
6,697,008 B1 2/2004 Sternowski
6,804,495 B2 10/2004 Duthie
7,006,039 B2 * 2/2006 Miyamoto et al. ............ 342/15
7,304,607 B2 * 12/2007 Miyamoto et al. ............ 342/15
2006/0238414 A1 * 10/2006 Miyamoto et al. ............ 342/15
2009/0009379 A1 * 1/2009 Olsson ........................ 342/14

FOREIGN PATENT DOCUMENTS

WO WO 2007086790 A1 * 8/2007

OTHER PUBLICATIONS

PCT/ISA/210—International Search Report—May 16, 2007.
PCT/IPEA/409—International Preliminary Report on Patentability—April 4, 2008.
PCT/ISA/237—Written Opinion of the International Searching Authority—May 16, 2007.

* cited by examiner

*Primary Examiner*—Dan Pihulic
(74) *Attorney, Agent, or Firm*—Venable LLP; Eric J. Franklin

(57) ABSTRACT

A method for creating jamming within an area and a jamming arrangement. The arrangement includes a plurality of distributed jammers. The jammers include a transmitter, receiver and logic unit and communication is established with the jammers. Communication is established directly between jammers included in the arrangement and information that is to be transmitted from one jammer to the other jammers is transmitted by superposing the information on the jamming signal that is produced by the jammers. An autonomous distributed arrangement is achieved that is difficult to disable and that can be made relatively simple, reliable and cost-effective.

13 Claims, 2 Drawing Sheets

METHOD FOR CREATING INTERFERENCE, AND JAMMING ARRANGEMENT

CROSS-REFERENCE TO RELATED APPLICATIONS

This application claims priority to Swedish patent application 0600156-4 filed 25 Jan. 2006 and is the national phase under 35 U.S.C. § 371 of PCT/SE2007/000054 filed 23 Jan. 2007.

FIELD OF THE INVENTION

The present invention relates to a method for creating interference within an area, over which a plurality of jammers are distributed and form a group in which each of the jammers can be arranged to transmit a jamming signal, and in which communication is established between the jammers comprised in the group. The invention also relates to a jamming arrangement comprising a plurality of communicating jammers intended to be distributed over an area, each of which jammers comprises a transmitter, a receiver and a logic unit.

BACKGROUND OF THE INVENTION

Traditionally, jammers are currently to be found in the form of vehicle-mounted electronic units with associated directional antennas that are directed towards the area that is to be exposed to jamming signals. The jammers utilize high outputs in order to achieve a long range. The position of such conventional jammers is easy to determine by taking bearings and the position of the jammer can be regarded as having been disclosed when the jamming commences. In addition, the traditional jammers that are located at a great distance from the target objects that are to be jammed have a low efficiency, as the electromagnetic radiation from these jammers decreases with distance and hence the electromagnetic radiation that is transmitted with a high output must travel a long way before the radiation acts as interference on the target object. In addition, these conventional jammers are difficult to construct and expensive to maintain on account of the high output that has to be able to be handled. Conventional jammers are vulnerable in the sense that the whole ability to jam can be disabled by a single strike.

It can also be the case that jammers are fired out or placed in some other way into an area that is to be jammed. The distributed transmitters disclose their position when transmitting commences and if several jammers are arranged within a limited area, there is normally no provision for coordinating the jamming functions.

However, jamming arrangements have recently been proposed with several coordinated jammers, see U.S. Pat. No. 6,414,622 B1. According to the said US patent, a plurality of jammers is in contact with and under the control of a sensor via data links. Such an arrangement is less vulnerable than the conventional jammers, as the arrangement can be regarded as being able to maintain a certain degree of functionality even if one jammer is disabled. A weakness in the arrangement is, however, the dependency on the sensor and hence the lack of autonomy for the jammers. If the sensor or its data link to the jammers is disabled, the whole installation will be disabled.

SUMMARY OF THE INVENTION

The object of the present invention is to provide a method and an arrangement that does not have the defects mentioned above. The object of the invention is achieved by means of a method for creating interference within an area, characterized in that communication is established directly between the jammers comprised in the arrangement and in that the information that is transferred from one jammer to other jammers is superposed on the jamming signal produced by the jammer, and a jamming arrangement characterized in that the transmitters comprise an information-superposing unit for superposing information on the jamming signal produced by a transmitting jammer for transmission between communicating jammers.

By setting up direct communication between individual jammers and transmitting information between jammers comprised in the arrangement in the jamming signal, a method and an arrangement are proposed that have many advantages in comparison with previously-known methods and jamming arrangements. The proposed jammer arrangement is difficult to attack and difficult to locate by taking bearings. The arrangement has redundancy in the sense that one disabled jammer does not affect the whole jamming function. Due to the interaction of several distributed jammers, locating a jammer by taking bearings can be made more difficult. In comparison with the traditional jammers, an improved jamming effect is achieved as the source of interference can be positioned closer to the target. Other effects are improved energy-efficiency and an advantageous power/distance ratio. Another valuable aspect is that the arrangement is easy to adapt to different protection requirements, as it is possible to vary the number of jammers comprised in the arrangement as required, without having to modify the arrangement. The arrangement is thereby easy to adapt to a planned area that is to be jammed.

According to an advantageous embodiment of the method, information is superposed on the jamming signal produced by the jammer by modulating the jamming signal. According to another advantageous embodiment of the method, when the jamming signal consists of jamming pulses, the superposed information affects the characteristics of the jamming pulses with regard to amplitude, pulse length and/or distance between pulses.

According to another advantageous embodiment of the method, one of the jammers in the group is allocated a master function. Alternatively, according to yet another advantageous embodiment of the method, all the jammers in the group of jammers can initially be allocated a slave function with the possibility of one of a plurality of jammers later changing to a master function, in response to other jammers comprised in the group of jammers.

According to a preferred method, the jammers are distributed by being fired out. In this way, jammers can be distributed over a suitable area quickly and with few risks. The distribution of the jammers can advantageously be carried out by means of a shell.

As communication is set up directly between the jammers comprised in the arrangement, a network is created in which the individual jammers are able to obtain information about how the other jammers are acting. The various jammers can thereby be arranged to transmit at different times and in this way can mislead any attempt to locate them by taking bearings. An advantageous embodiment of the method is characterized in that information transferred between jammers is utilized for controlling the transmission of jamming signals by the jammer that receives the information.

According to an advantageous embodiment of the jamming arrangement, jammers comprised in the arrangement comprise a jamming pulse generator, for generating jamming signals in the form of jamming pulses, and a modulator that is comprised in the information-superposing unit and acts upon the jamming pulse generator.

The receiver in the jammer suitably comprises a detector for detecting information superposed on the received jamming signal. The detector can comprise a demodulator and it is proposed that, in the transmitter arrangement, the receiver will comprise a dynamic damping unit that is arranged before the detector in the path taken by the signal. The damping unit effectively protects the receiver from high levels of incoming signals.

BRIEF DESCRIPTION OF THE DRAWINGS

The invention will be described below schematically and for the purpose of exemplification, with reference to the attached drawings in which.

DETAILED DESCRIPTION OF EMBODIMENTS OF THE INVENTION

Figure 1:
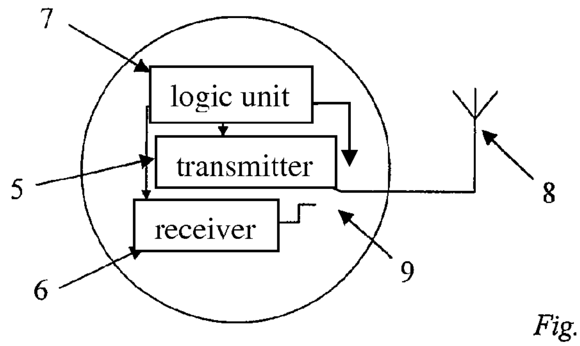
FIG. 1 shows an example of a jammer in transmitter mode.
Figure 2:
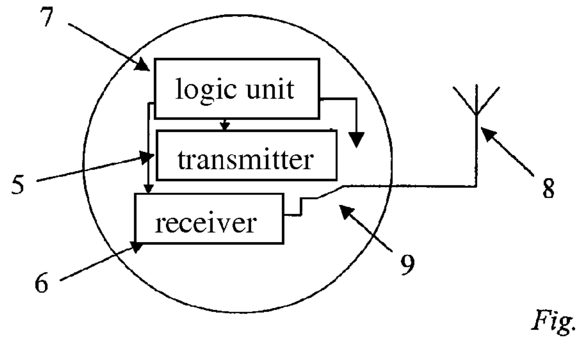
FIG. 2 shows an example of a jammer in receiver mode.
Figure 5:
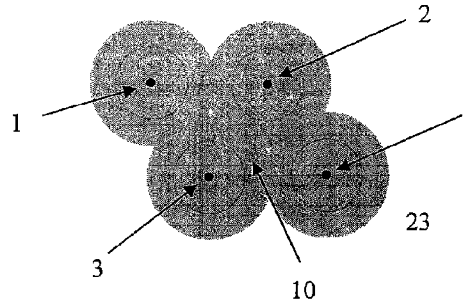
FIG. 5 shows a jamming arrangement with four jammers.

A proposed embodiment of the jamming arrangement comprises a plurality of jammers shown schematically in FIG. 1 in transmitter mode and in FIG. 2 in receiver mode. A plurality of such jammers is distributed over an area and FIG. 5 shows an example with four distributed jammers 1-4. After the jammers 1-4 have been distributed, for example, by being fired out and preferably by means of a shell, communication is established between the jammers comprised in the arrangement.

As shown in FIGS. 1 and 2, the jammers comprise a transmitter 5, a receiver 6 and a logic unit 7. In the transmitter mode shown in FIG. 1, the transmitter 5 is connected to an antenna 8 by means of a change-over switch 9, while in the receiver mode shown in FIG. 2, the receiver 6 is connected to the same antenna 8 via the change-over switch 9. Four distributed jammers according to FIG. 5 that communicate with each other are regarded as jamming the grey-shaded area 10. The jammers 1-4 comprised in the arrangement are arranged to emit a jamming signal that is preferably in the form of jamming pulses. The jamming signal can be adjusted to the sensitivity of the object that is to be jammed, with a broadband jamming signal being more general and able to act against several different objects. The jamming signal is transmitted from the jammer in pulses in accordance with technical aspects. Depending upon its rise time, a pulse can contain a wide spectrum of frequencies and accordingly can be used against several objects that are to be jammed. The transmission of the pulse can be controlled by adjusting, for example, the amplitude, pulse length, distance between pulses or by superposing modulated information on the pulse. In this way, information can be transferred in the jamming pulse. Other jammers that are within the range of the transmitting jammer can receive the information transmitted by the jammer. The information that is received is used by the other jammers to set up a network that distributes the jamming function between the jammers.

In the following, it is described in somewhat greater detail how the jammer arrangement can be constructed and two preferred functional principles are illustrated.

Each jammer or jamming node referred to below is used to designate the physical unit that comprises a transmitter 5 and a receiver 6. In a network, one jamming node functions initially as a jammer and the other jamming nodes function as receivers. The jamming node that initially sends information is called the master. The allocation of the master function can be carried out in various ways. According to one way, a jamming node is pre-programmed to be the master. According to another way, the master is determined on the basis of an algorithm. The other jamming nodes are called slaves and monitor the information that the master sends and act on the basis of this information. If a master is disabled, a slave can undertake to function as master. Each slave has suitably an integral function enabling it to become master if no signal has been received within a certain period of time that is selected at random for each individual slave.

A master can send information to the surrounding jamming nodes with information about how they are to act. The master can be pre-programmed with which jamming nodes are located in the vicinity and it is also possible for the jamming node that is the master to request the other jamming nodes to identify themselves. Depending upon the current situation, the jamming node that is the master thereafter determines how the jamming network that has been established is to function. Each jamming node has suitably an address that is used to designate the identity of the jamming node and information for a master about when a message is addressed to a jamming node.

Figure 3A:
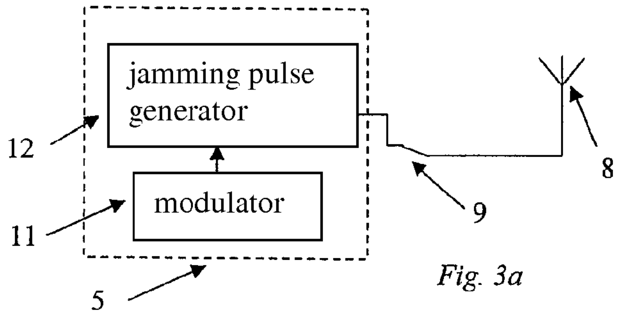
FIG. 3*a* shows schematically the construction of a transmitter comprised in a jammer.

FIG. 3*a* shows a schematic example of a construction of the transmitter 5 in a jammer. The transmitter 5 comprises a modulator 11 connected to a jamming pulse generator 12. The jamming pulse generator 12 is connected to the antenna 8 via the change-over switch 9. The information that is sent is modulated, for example by pulse modulation. The system in the jamming node that generates the jamming pulses, that is here the jamming pulse generator 12, is controlled by the modulator 11 and superposes information on the jamming pulses.

Figure 3B:
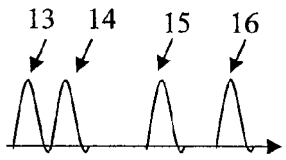
FIG. 3*b* shows an example of an emitted jamming signal.

An example of a jamming signal generated by the transmitter as a function of the time is shown in FIG. 3*b*. FIG. 3*b* shows as an example that, in this case, the jamming pulses 13-16 have essentially constant amplitude while the time slots between individual jamming pulses vary.

Figure 4B:
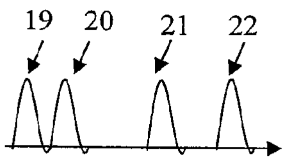
FIG. 4*b* shows an example of a received jamming signal.
Figure 4A:
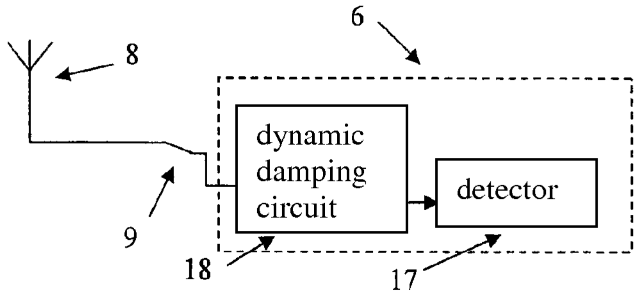
FIG. 4*a* shows schematically the construction of a receiver comprised in a jammer.

FIG. 4*a* shows a schematic example of a construction of the receiver 6 of a jammer. The receiver comprises a detector or demodulator 17 and a dynamic damping circuit 18 arranged on the input side of the detector. An antenna 8 that is common to the jammer is connected to the dynamic damping circuit 18 via a change-over switch 9. An incoming jamming signal that is received by the antenna 8 in the jammer is taken to the receiver 6 in the jammer via the change-over switch 9. In order to protect the detector 17 in the receiver from high signal powers, the incoming jamming signal has to pass through the dynamic damping circuit 18 before it reaches the detector 17. The detector 17 interprets the received jamming signal by demodulating the information content in the jamming signal. The information content is thereafter communicated to the logic unit 7 in the jammer for further evaluation.

An example of the appearance of an incoming jamming signal received by the antenna 8 is shown in FIG. 4*b* as a function of the time, which jamming signal is the same as the transmitted jamming signal shown in FIG. 3*b* under ideal conditions. The jamming pulses have been designated here with the reference numerals 19-22 and in the same way as for the transmitted jamming signal, the incoming jamming signal has different time slots between the jamming pulses 19-22 shown.

Two different proposed functional principles are described below.

For principle I, it is the case that a number of jammers or jamming nodes are distributed in a random way, with one of the jamming nodes being selected as the master and having knowledge of which slaves are in the vicinity. According to this principle, the following takes place:

1. The master addresses messages to slaves comprised in the jammer arrangement. The message is comprised in a jamming signal that can also contain other superposed information.
2. Depending upon the address, one or more slaves receive the addressed message and follow the instructions, while other nodes that have not been addressed ignore the message.
3. The message contains information about the time at which the jamming node is to transmit. The time can be given on the basis of synchronized clocks in all the nodes or alternatively can be provided in the time information that is comprised in the transmitted message.
4. The previously-addressed node, the slave, continues to monitor the channel when the master sends information to a new node or acts on the basis of the instructions provided by the master.

For principle II, it is the case that a number of jammers or jamming nodes have been distributed in a random way. No master is initially selected and all the jamming nodes have a "silent" period after they have been distributed.

1. After having listened for a master for a random period of time, one of the jamming nodes, that, like the other nodes, is a slave, selects to take the initiative itself to coordinate a network and hence also assume the role of master.
2. The master addresses messages to the slaves that are in the vicinity. The message is comprised in a jamming signal that can also contain other superposed information.
3. Depending upon the address, one or more slaves receive the addressed message and follow the instructions, while other nodes that have not been addressed ignore the message.
4. The message contains information about the time at which the jamming node is to transmit. The time can be given on the basis of synchronized clocks in all the nodes or alternatively can be provided in the time information that is comprised in the transmitted message.
5. The previously-addressed node, the slave, continues to monitor the channel when the master sends information to a new node or acts on the basis of the instructions provided by the master.

Figure 6:
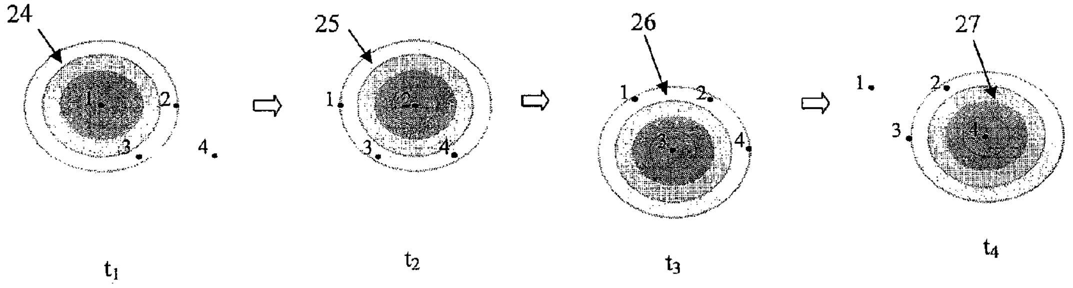
FIG. 6 shows an example of a transmission sequence for four jammers in a jamming arrangement.

The jamming signal arrangement shown in FIG. 5 has four jammers 1-4 distributed over an area 23 to cover the grey-shaded area 10. One of the jammers assumes the role of master and in this example let us assume that the jammer 1 has assumed the role as master according to any one of the two principles described above. From FIG. 6 that shows the activity of the jammers at different times $t_1$-$t_4$, it can be seen here that jammer 1 first sends a jamming signal covering the grey area 24 at the time $t_1$, after which jammer 2 sends a jamming signal covering the grey area 25 at the time $t_2$. Then jammer 3 sends a jamming signal covering the grey area 26 at the time $t_3$, after which jammer 4 sends a jamming signal covering the grey area 27 at the time $t_4$. The sequence can then be repeated in the same order of transmission. When the jammers transmit with short intervals, the jammed area will correspond to a larger area or surface in comparison with the cover provided by the individual jammers and the jamming signal arrangement can create a jammed area corresponding to the grey-shaded area 10 shown in FIG. 5.

The invention is not limited to the embodiments described above as examples, but can be modified within the framework of the following claims.

The invention claimed is:

1. A method for creating jamming within an area, the method comprising:

distributing a plurality of jammers to form a group in which each of the jammers can be arranged to transmit a jamming signal, establishing communication directly between the jammers, transferring information from one jammer to the other jammers, and superposing the transferring of information on the jamming signal produced by the one jammer.

2. The method according to claim 1, wherein the information is superposed on the jamming signal produced by the jammer by modulating the jamming signal.

3. The method according to claim 1, wherein the jamming signal comprises jamming pulses, wherein the superposed information affects characteristics of the jamming pulses with regard to amplitude, pulse length and/or distance between pulses.

4. The method according to claim 1, further comprising:

allocating a master function to one of the jammers in the group.

5. The method according to claim 1, further comprising:

initially allocating to all the jammers in the group of jammers a slave function with a possibility of one of a plurality of jammers changing later to a master function in response to the other jammers comprised in the group of jammers.

6. The method according to claim 1, wherein the jammers are distributed by being fired out.

7. The method according to claim 1, wherein the jammers are distributed by a shell.

8. The method according to claim 1, wherein information transferred between jammers is utilized for controlling the transmission of jamming signals by the jammer that receives the information.

9. A jamming arrangement, comprising:

a plurality of communicating jammers intended to be distributed over an area, each jammer comprising a transmitter, a receiver and a logic unit, wherein the transmitter comprises an information-superposing unit configured to superpose information on a jamming signal of a transmitting jammer for transferring the information between communicating jammers.

10. The jamming arrangement according to claim 9, wherein each jammer comprises a jamming pulse generator for generating a jamming signal in the form of jamming pulses and a modulator that acts on the jamming pulse generator and is comprised in the information-superposing unit.

11. The jamming arrangement according to claim 9, wherein the receiver in each jammer comprises a detector configured to detect information superposed on a received jamming signal.

12. The jamming arrangement according to claim 11, wherein the receiver comprises a dynamic damping unit arranged before the detector in the path taken by the signal.

13. The jamming arrangement according to claim 11, wherein the detector comprises a demodulator.

* * * * *